(12) United States Patent
Ichinose

(10) Patent No.: US 9,757,913 B2
(45) Date of Patent: Sep. 12, 2017

(54) APPARATUS FOR CORRECTING SHAPE OF GREEN TIRE

(71) Applicant: BRIDGESTONE CORPORATION, Chou-ku, Tokyo (JP)

(72) Inventor: Masayuki Ichinose, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 157 days.

(21) Appl. No.: 14/771,880

(22) PCT Filed: Mar. 4, 2014

(86) PCT No.: PCT/JP2014/001194
§ 371 (c)(1),
(2) Date: Sep. 1, 2015

(87) PCT Pub. No.: WO2014/136444
PCT Pub. Date: Sep. 12, 2014

(65) Prior Publication Data
US 2016/0031172 A1 Feb. 4, 2016

(30) Foreign Application Priority Data
Mar. 7, 2013 (JP) .................................. 2013-045062

(51) Int. Cl.
*B29D 30/06* (2006.01)
*B29D 30/00* (2006.01)

(52) U.S. Cl.
CPC ......... *B29D 30/06* (2013.01); *B29D 30/0016* (2013.01); *B29D 30/0061* (2013.01);
(Continued)

(58) Field of Classification Search
CPC ............ B29D 30/0005; B29D 30/0016; B29D 30/0061; B29D 30/06; B29D 30/0662; B29D 2030/0022; B29D 2030/0665
See application file for complete search history.

(56) References Cited

U.S. PATENT DOCUMENTS 3,824,048 A 7/1974 Getz
4,600,370 A * 7/1986 Kaneko .............. B29D 30/0603
425/38

(Continued)

FOREIGN PATENT DOCUMENTS

CN 1759004 A 4/2006
EP 1604810 A1 12/2005
(Continued)

OTHER PUBLICATIONS

Jun. 3, 2014 International Search Report issued in International Patent Application No. PCT/JP2014/001194.
(Continued)

*Primary Examiner* — James Mackey
(74) *Attorney, Agent, or Firm* — Kenja IP Law PC

(57) ABSTRACT

Apparatus and method for correcting the shape of a green tire configured so that, even if a side wall portion (S) is subjected to local crushing deformation during its temporary storage, such deformation is effectively corrected to easily improve the tire uniformity. A pressurized fluid is applied to an inner chamber of a green tire (G) having bead portions (B) held coaxially by upper and lower holders (56, 89), for setting the tread portion (T) of the green tire (G) coaxially to the bead portions (B). The side wall portions (S) is deformed outward and applied with an internal tension in the meridian direction, for correcting the shape of the green tire (G). Crushing deformation on the side wall portion (S) is thereby effectively recovered and corrected before vulcanization.

3 Claims, 9 Drawing Sheets

61 · · · detecting sensor  70 · · · lower support plate
73 · · · lower holding claw  74 · · · locking portion
96 · · · bladder  101 · · · correcting means
G · · · green tire  B · · · bead portion
S · · · side wall portion  T · · · tread portion

(52) U.S. Cl.
CPC .. *B29D 30/0005* (2013.01); *B29D 2030/0022* (2013.01); *B29D 2030/0665* (2013.01)

(56) References Cited

U.S. PATENT DOCUMENTS

| | | | | |
|---|---|---|---|---|
| 7,316,757 | B2 * | 1/2008 | Maekawa | B29D 30/0645 156/111 |
| 7,740,788 | B2 * | 6/2010 | Yoshino | B29D 30/0662 264/326 |
| 2007/0170620 | A1 | 7/2007 | Yoshino et al. | |

FOREIGN PATENT DOCUMENTS

| | | |
|---|---|---|
| JP | S60-264236 A | 12/1985 |
| JP | H02-147206 A | 6/1990 |
| JP | H02-248240 A | 10/1990 |
| WO | 2005/046975 A1 | 5/2005 |

OTHER PUBLICATIONS

May 27, 2014, Notification of Reasons for Refusal issued by the Japan Patent Office in the corresponding Japanese Patent Application No. 2013-045062.

* cited by examiner

16 · · · bearer
56, 89 · · · holder
J · · · directly-below position

32 · · · driving means
67 · · · moving means
L · · · standby position

| 61 · · · detecting sensor | 70 · · · lower support plate |
| 73 · · · lower holding claw | 74 · · · locking portion |
| 96 · · · bladder | 101 · · · correcting means |
| G · · · green tire | B · · · bead portion |
| S · · · side wall portion | T · · · tread portion |

D···operative position

APPARATUS FOR CORRECTING SHAPE OF GREEN TIRE

TECHNICAL FIELD

This disclosure relates to a method and an apparatus for correcting the shape of a green tire having a side wall portions subjected to crush deformation locally the circumferential direction.

BACKGROUND

Ordinarily, after the end of molding and before being carried into a vulcanizer, a green tire G is temporarily stored by hanging on two horizontal storage rods A, as illustrated in FIGS. 9 and 10. However, if the green tire G is temporarily stored in such mode, there is a probability that base width of bead portions B (a spacing between a pair of bead portions B) varies in each green tire G depending on the way to carry the green tire G to the storage rods A, and circularity of the bead portions B during storage is deteriorated. However, if the green tire G is subjected to vulcanization when still in such state, qualities of the tire such as uniformity, balance and the like frequently suffer negative effects. In order to solve such problem, conventionally proposed is, for example, a disclosure in WO2005/046975A1 (PTL 1).

CITATION LIST

Patent Literature

PTL1 WO2005/046975A1

This disclosure is made so that the width between the upper and lower bead portions B is corrected by moving first and second locking components in a radially expanding direction to correct by pressing lower and upper bead portions B on upper and lower sides of a green tire G to a circular shape at a predetermined diameter, while adjusting a distance between the first and the second locking components by lifting at least one of the lower and the upper bead correcting means up and down with a lifting means. Here, during the temporary storage of the green tire G, besides disorder of the base width of the bead portions B and/or deterioration of the circularity of the aforementioned green tire G, due to a large mass of a tread portion T, the tread portion T is lowered (hanged down) while maintaining the shape (circular shape) when being molded, crush deformation in radial direction (vertical direction) is generated locally in the circumferential direction of the side wall portions S, namely the side wall portion S located above the storage rods A, and the bead portions B at the portions where crush deformation is generated are spaced from each other and the base width of the bead portions B varies in a circumferential direction of the green tire G.

SUMMARY

Technical Problem

However, with respect to the aforementioned conventional shape correcting apparatus, there is a problem that although the base width and the circularity of the bead portions B can be corrected, the aforementioned crush deformation generated in a part of the side wall portions S cannot be corrected. Therefore, the green tire G is subjected to vulcanization while still in a state that crush deformation is generated in a part of the side wall portions S, and as a result, when the crush deformation on the side wall portions S is enlarged and cannot be eliminated during vulcanization, uniformity, in particular RFV (radial force variation) of the tire product is deteriorated. Moreover, recently, in response to the requirement on weight reduction of tire product, thickness lessening of side wall portions S is ongoing, but in this way, along with thickness lessening of side wall portions S, the level of the aforementioned crush deformation is further raised, and the aforementioned problem becomes more serious.

This disclosure is to provide a method and an apparatus for correcting the shape of a green tire, which is capable of effectively correcting such crush deformation and easily improving tire uniformity, even if a part of the side wall portion is subjected to crush deformation due to temporary storage.

Solution to Problem

Such purpose can be achieved with an apparatus for correcting the shape of a green tire, which comprises: a pair of holders for holding a pair of bead portions of a green tire subjected to crushing deformation locally in a circumferential direction of a side wall portion, while maintaining a coaxial relation thereof; and a correcting means for correcting the shape of the green tire by applying a pressurized fluid to an inner chamber of the green tire with beads portions held by the pair of holders, setting a center axis of a tread portion of the green tire to be in accord with central axes of the pair of bead portions which are maintained in a coaxial relation, and deforming the side wall portions toward an outer side. The correcting means comprises a bladder to be set on a radially inner side of the pair of coaxial bead portions, coaxially with the center axis of the bead portions, wherein the bladder has a constant thickness and is configured so that, as the bladder is supplied with a pressurized fluid at a pressure no higher than an elongation initiating pressure of the bladder, the pressure is applied to the inner chamber of the green tire via the bladder, causing the bladder to be inflated and pressed against an inner surface of the tread portion and the side wall portions of the green tire.

Second, the purpose can be achieved with a method for correcting the shape of a green tire, comprising: holding a pair of bead portions of a green tire with a pair of holders while maintaining a coaxial relation therebetween, said green tire being subjected to crushing deformation in a part of a circumferential direction of side wall portions; and correcting the shape of the green tire by applying a pressurized fluid to an inner chamber of the green tire with the bead portions held by the pair of holders, setting a center axis of a tread portion of the green tire to be in accord with central axes of the pair of bead portions which are maintained in a coaxial relation, and deforming the side wall portions toward an outer side.

Advantageous Effect

In this disclosure, the shape of the green tire is corrected by applying the pressurized fluid into the inner chamber of the green tire, with the bead portions held by the respective holders while being maintained in a coaxial relation, setting the central axis of the tread portion of the green tire to be in accord with the central axes of the pair of bead portions, and simultaneously deforming the side wall portion outward to thereby generate an internal tension in meridian direction of the side wall portion. Therefore, the crush deformation generated in a part of the side wall portion is effectively recovered before vulcanization. Thereby, it is possible to easily improve uniformity of a vulcanized tire product, and in particular, the method is effective to a tire having side wall portions that are thin and are subjected to serious crush deformation due to temporary storage. In addition, the crush deformation can be uniformly recovered and corrected by pressing the portions subjected to crush deformation on a side wall portion from the inner side.

With respect to the temporarily stored green tire, due to crush deformation on a part of the side wall portions, the shape of the green tire is deformed, but according to the features disclosed in claim 2, it is possible to easily detect whether the holding is secure, even with respect to the aforementioned green tire. In addition, according to the features disclosed in claim 3, it is possible to secure the holding of the lower side bead portion by the lower side holder (the lower holding claws), and simultaneously set the upper side and lower side bead portions to be coaxial easily and securely. Further, according to the features disclosed in claim 4, it is possible to easily improve security of the operator with a simple structure, and according to the features disclosed in claim 5, it is possible to simplify the structure.

DETAILED DESCRIPTION

Embodiment 1 of this disclosure is described as follows based on Drawings.

Figure 1:
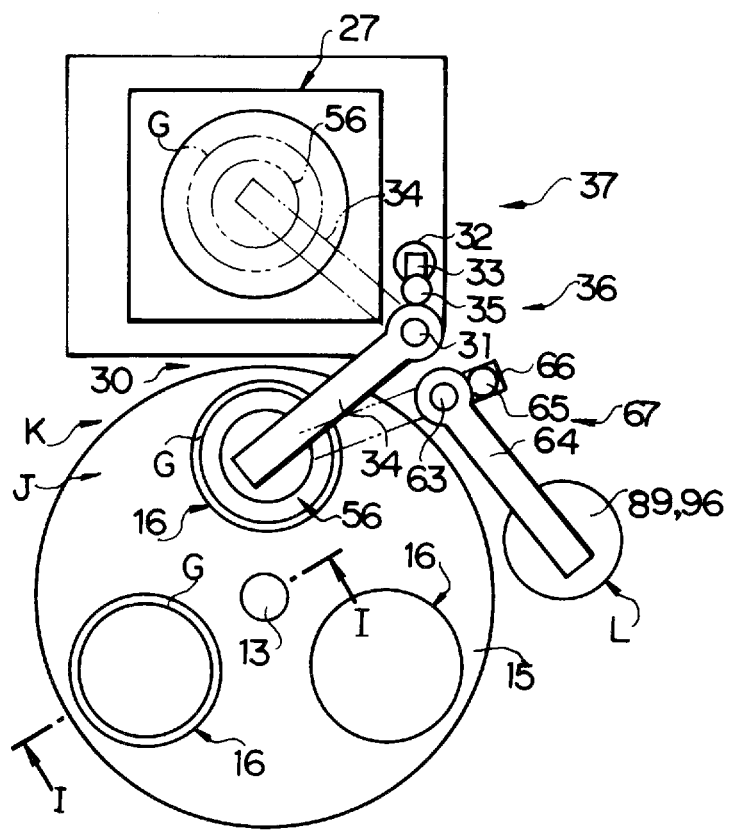
FIG. 1 is a schematic plan view showing Embodiment 1 of this disclosure.
Figure 2:
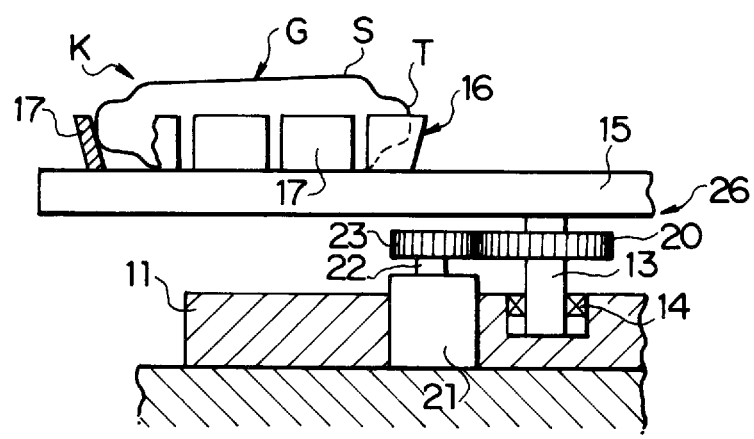
FIG. 2 is a cross-sectional view as seen in the direction of arrows I-I of FIG. 1.

In FIGS. 1 and 2, represented by reference numeral 11 is a horizontal base. At a central portion of the base 11, a lower end portion of a rotation shaft 13 extending vertically is rotatably supported via a bearing 14. At an upper end of the rotation shaft 13, a vertical rotation plate 15 in a discoid shape is fixed coaxially with the rotation shaft 13, and on an upper surface of the rotation plate 15, a plurality, herein 3, of bearers 16 are disposed circumferentially at equal distances. Each bearer 16 is formed of a plurality of support pieces 17 having arc-shaped cross sections, the support pieces 17 being disposed circumferentially at an equal distance, and expanding upward with the lower ends thereof fixed to the rotation plate 15.

Radial (vertical) crush deformation may be generated due to hanging on the storage rods A for the temporary storage as mentioned above, locally in the circumferential direction of a side wall portion S, i.e. the side wall portion S located above the storage rods A. In this instance, when the green tire G is carried onto the bearers 16 by an operator or a carrying means which is not illustrated, in a state where the part on the bead portions B subjected to the crush deformation are spaced from each other and the base width of the bead portions B varies in the circumferential direction of the green tire G, the green tire G is stored as being mounted on the bearers 16 horizontally (in a state where the rotation axis of the green tire G extends approximately vertically). Represented by reference numeral 20 is an external gear fixed to a rotation shaft 13 between the base 11 and the rotation plate 15. This external gear 20 and an external gear 23 fixed on the output shaft 22 of a driving motor provided on the base 11 are in gear with each other. When the driving motor 21 functions and the rotation plate 15 rotates intermittently, the bearers 16 with the green tire G mounted thereon moves to a delivery position K directly below a directly-below position J mentioned in the following, and stores the green tire G at the delivery position K horizontally.

The aforementioned external gear 20, driving motor 21 and external gear 23, as a whole, constitute a moving mechanism 26 for moving a horizontal green tire G stored at any one of the bearers 16. Further, in this disclosure, it is possible to dispose one or more bearers on a moving truck to store the green tire G horizontally, and move the moving truck, to thereby carry the green tire G stored on the bearers to the delivery position K. Moreover, in this disclosure, as the aforementioned moving mechanism 26, a link mechanism or a cam mechanism can be used. Represented by reference numeral 27 is a vulcanization apparatus disposed on one side of the rotation plate 15. When the green tire G is carried into this vulcanization apparatus 27 horizontally, the vulcanization apparatus 27 is closed and vulcanizes the green tire G into a tire product (a vulcanized tire).

Represented by reference numeral 30 is a carrying means for carrying the green tire G received from the bearers 16 to the vulcanization apparatus 27. This carrying means is normally called a vertical loader. The carrying means 30 has a guide post 31 extending vertically, the guide post 31 having a fluid cylinder 32 connected therewith as a driving means extending parallel to the guide post 31. Represented by reference numeral 33 is a liftable object supported slidably by the guide post 31. This liftable object 33 has an end (upper end) of a piston rod of the fluid cylinder 32 connected therewith, and as a result, when the fluid cylinder 32 functions, the liftable object 33 is lifted up and down by being guided by the guide post 31. Further, in this disclosure, as the aforementioned driving means, a screw mechanism, a rack-pinion mechanism or a chain mechanism can be used.

Represented by reference numeral 34 is a horizontal swing arm having a base end portion supported rotatably by the liftable object 33. The base end portion of this swing arm 34 is penetrated by the guide post 31. Represented by reference numeral 35 is a driving motor supported by the liftable object 33. Driving power for rotation of this driving motor 35 is transferred to the base end portion of the swing arm 34 via an external gear which is not illustrated, and swings the swing arm 34 in a horizontal plane centered on the base end portion thereof (the guide post 31). The aforementioned driving motor 35 and external gear, as a whole, constitute a swing mechanism 36 for swinging the swing arm 34, and in this disclosure, as the aforementioned swing mechanism 36, a link mechanism or a cam mechanism can be used. The aforementioned fluid cylinder 32 as a driving means and the swing mechanism 36, as a whole, constitute a moving means 37 for horizontally or vertically moving, i.e. three-dimensionally moving the upper holder mentioned below, the upper holder being disposed at an end portion of the swing arm 34.

Figure 3:
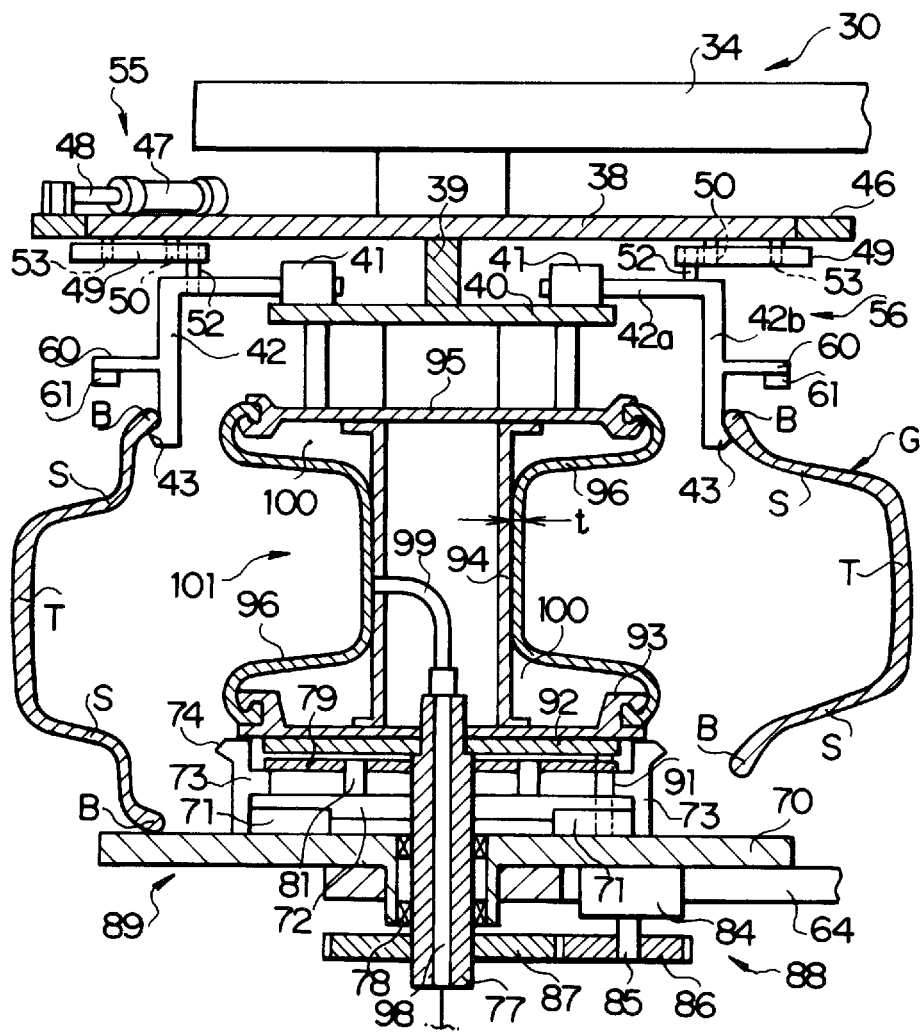
FIG. 3 is a front cross-sectional view showing a green tire as being held by an upper holder.
Figure 4:
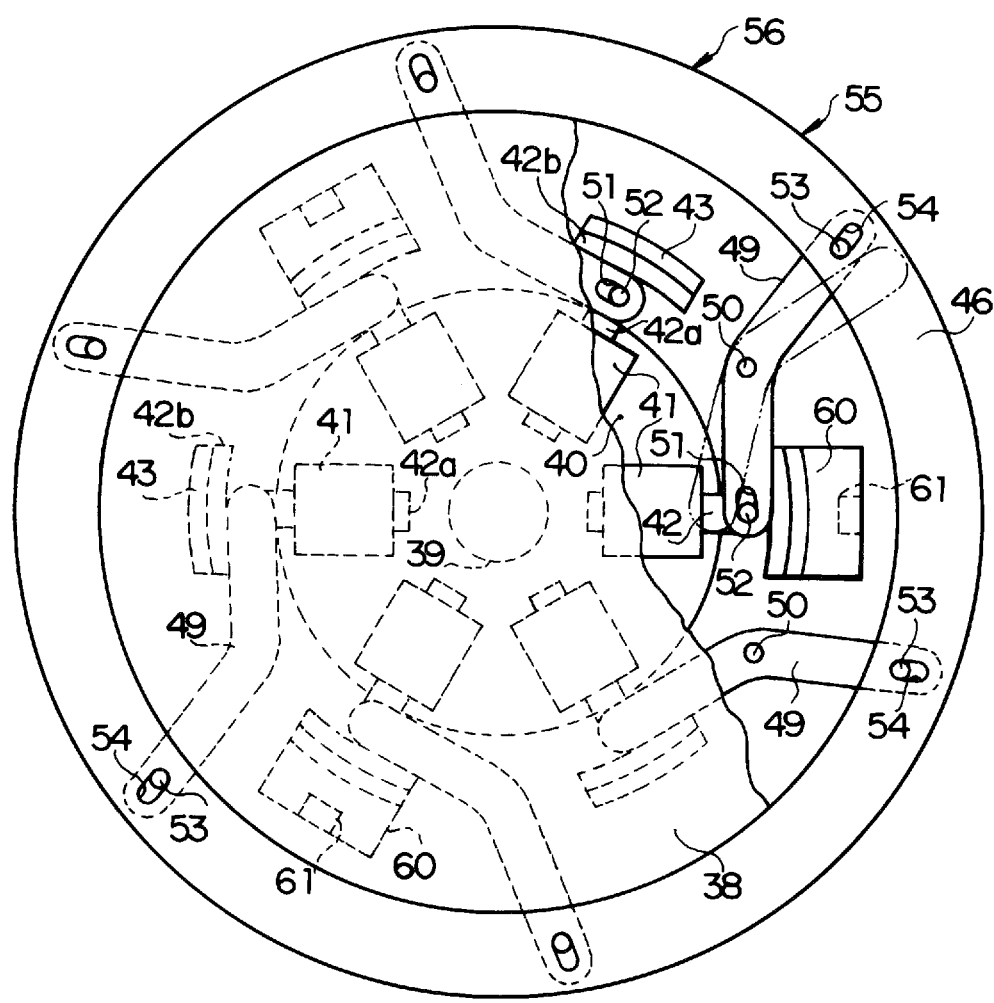
FIG. 4 is a partially-cut-away plan view showing the upper holder.

In FIGS. 1, 3 and 4, at the end portion of the swing arm 34, a horizontal support disc 38 in a discoid shape is fixed, and on the lower surface of this support disc 38, an upper support plate 40 in a discoid shape coaxial with the support disc 38 via a bracket 39 is installed. On an upper surface of this upper support plate 40, a plurality, herein 6, of guide blocks 41 are disposed circumferentially at equal distances, and on these guide blocks 41, horizontal portions 42a of a plurality (a number the same as the guide blocks 41) of upper holding claws 42 are supported slidably, the upper holding claws 42 containing horizontal portions 42a extending radially and vertical portions 42b having an arc-shaped cross section, the vertical portions being located radially outer than a circumference of the upper support plate 40 and extend vertically downward from a radially outer end of the horizontal portions 42a. At lower ends of the vertical portions 42b of each upper holding claw 42, locking portions 43 are formed, the locking portions 43 having cross sections in an approximately-triangular arc shape protruding outward radially, and these upper holding claws 42 can hold the green tire G from a radially inner side and from an axially inner side, when the upper holding claws 42 move synchronously and outward radially, to contact the locking portions 43 with an axially inner side surface of an upper side bead portion B of the green tire G.

At a radially outer side of the support disc 38, a rotation ring 46 in a ring shape, which is coaxial with the support disc 38, is rotatably and fittedly supported, the rotation ring 46 being connected with an end of the piston rod 48 of the fluid cylinder 47, which contains an air cylinder, etc. disposed on the upper surface of the support disc 38. Represented by reference numeral 49 is a plurality (a number the same as the upper holding claws 42) of transfer links, the transfer links having length-directional central portions connected rotatably with the support disc 38 via pins 50 and extend approximately radially, and long holes 51 formed on radially inner end portions of these transfer links 49 are inserted by pins 52 erected on the horizontal portions 42a of each upper holding claw 42. On the other hand, pins 53 protruding upward are fixed at radially outer end portions of each transfer link 49, and these pins 53 are inserted into a plurality (a number the same as the transfer links 49) of long holes 54, the long holes 54 being formed in the rotation ring 46 and extend radially.

As a result, when the fluid cylinder 47 functions and rotates the rotation ring 46, the transfer links 49 swing synchronously centered on the pins 50, while such synchronous swing of the transfer links 49 is transferred to the upper holding claws 42 via the pins 52, and thereby, these upper holding claws 42 are guided by the guide blocks 41 and move synchronously and radially, to hold or release the upper holding claws 42. The aforementioned guide blocks 41, rotation ring 46, fluid cylinder 47, transfer links 49 and pins 50, 52, 53, as a whole, constitute a synchronous moving mechanism 55 for moving the plurality of upper holding claws 42 synchronously and outward radially. Moreover, the aforementioned upper holding claws 42 and synchronous moving mechanism 55, as a whole, constitute an upper holder 56, as a holder on one side (upper side) for holding the upper side bead portion B of the green tire G.

Accordingly, in this embodiment, the upper holder 56 is formed of a part of the carrying means 30 (the vertical loader). Further, in the aforementioned embodiment, the green tire G on the bearer 16, which was moved to the delivery position K, was held by the upper holder 56, while in this disclosure, it is possible to set the rotation plate to be unrotatable, and move the upper holder 56 within a horizontal plane, to thereby hold the green tire G carried by any one of the bearers 16. Additionally, due to function of the aforementioned moving means 37, the upper holder 56 is lowered and the upper holding claws 42 are inserted into the green tire G stored at the bearer 16 from the upper side, and due to function of the synchronous moving mechanism 55, the upper holding claws 42 are then moved synchronously and outward radially, and the lower end portions of the upper holding claws 42 (the vertical portions 42b) contact with the upper side bead portion B of the green tire G at a certified low contact pressure.

At this state, the fluid cylinder 32 of the moving means 37 functions to raise the swing arm 34 and the upper holder 56, while in this case, the upper holding claws 42 are raised in slidable contact with the upper side bead portion B, and a hanging-down side of the upper bead portion B is pulled up by the locking portions 43; as a result, the locking portions 43 of all upper holding claws 42 become in contact with a surface at an axially outer side of the upper side bead portion B, and as illustrated in FIG. 3, the upper side bead portion B is held by the upper holding claws 42 of the upper holder 56 and becomes horizontal, from an inner side, herein from a radially inner side and an axially inner side. Here, as mentioned above, the green tire G is subjected to crush deformation locally in the side wall portion S in a circumferential direction, and base width of the bead portions B varies along the circumferential direction. Therefore, a lower side bead portion B inclines with respect to a horizontal direction, resulting in that a central axis of the upper side bead portion B and a central axis of the lower side bead portion are not coaxial, but intersects at a certain angle. Further, in this case, if the upper side bead portion and the lower side bead portion deviate from each other radially, the aforementioned central axes of the upper and lower side bead portions B may become torsional.

Represented by reference numeral 60 are protruding pieces formed as a whole on every other upper holding claw 42, more specifically, on circumferences of vertical central portions of the vertical portions 42b at a radially outer side, and detecting sensors 61 for detecting the green tire G, herein for detecting the side wall portions S, are installed on lower surfaces of each protruding piece 60, and these detecting sensors 61 are for detecting the presence/absence of the green tire G, and for detecting whether the upper side bead portion B of the green tire G are held at a defined state, in this embodiment, whether the upper side bead portion B is held horizontally as mentioned above, by detecting distances from the detecting sensors 61 to the green tire G (the side wall portions S). For example, when any one of the upper holding claws 42 fails to hold and the locking portion 43 of the upper holding claw 42 is in contact with a surface at a radially inner side or a surface at an axially outer side of the upper side bead portion B, the portion becomes lower than the other portions. When the detecting sensors 61 detect such state, the holding operation of the upper side bead portion B is repeated, or the operation is stopped, or a report is sent to the operator, etc. In this way, a plurality of detecting sensors 61 are spaced from each other in a circumferential direction on the upper holder 56 as one holder, and by disposing a plurality of detecting sensors 61 on the upper holder 56 in this way, even the shape of the green tire G is deformed, it is possible to simply detect whether the green tire G is securely held by the upper holder 56.

Here, in this embodiment, proximity switches are used as the aforementioned detecting sensors 61, while in this disclosure, it is possible as well to use ultrasound sensors, capacitance type displacement meters, laser displacement meters, etc. A guide post 63 is disposed extending vertically at a side other than the guide post 31. This guide post 63 is penetrated by a base end portion of a horizontal swing arm 64, and rotatably supports the same. Represented by reference numeral 65 is a driving motor supported by a support block 66 installed on the guide post 63 below the swing arm 64. Driving power for rotation of this driving motor 65 is transferred to the base end portion of the swing arm 64 via an external gear which is not illustrated, and swings the swing arm 64 centered on the base end portion thereof (the guide post 63) in a horizontal plane. The aforementioned driving motor 65 and the external gear, as a whole, constitute a moving means 67 for moving the lower holder mentioned below along an arc between a directly-below position J, which is located directly below the upper holder 56 in an above position, and a standby position L at a predetermined distance from the directly-below position, by swinging the swing arm 64, while in this disclosure, as the aforementioned moving means, a link mechanism or a cum mechanism can be used. In addition, in this disclosure, the lower holder can be moved along a straight line by a moving means.

Figure 5:
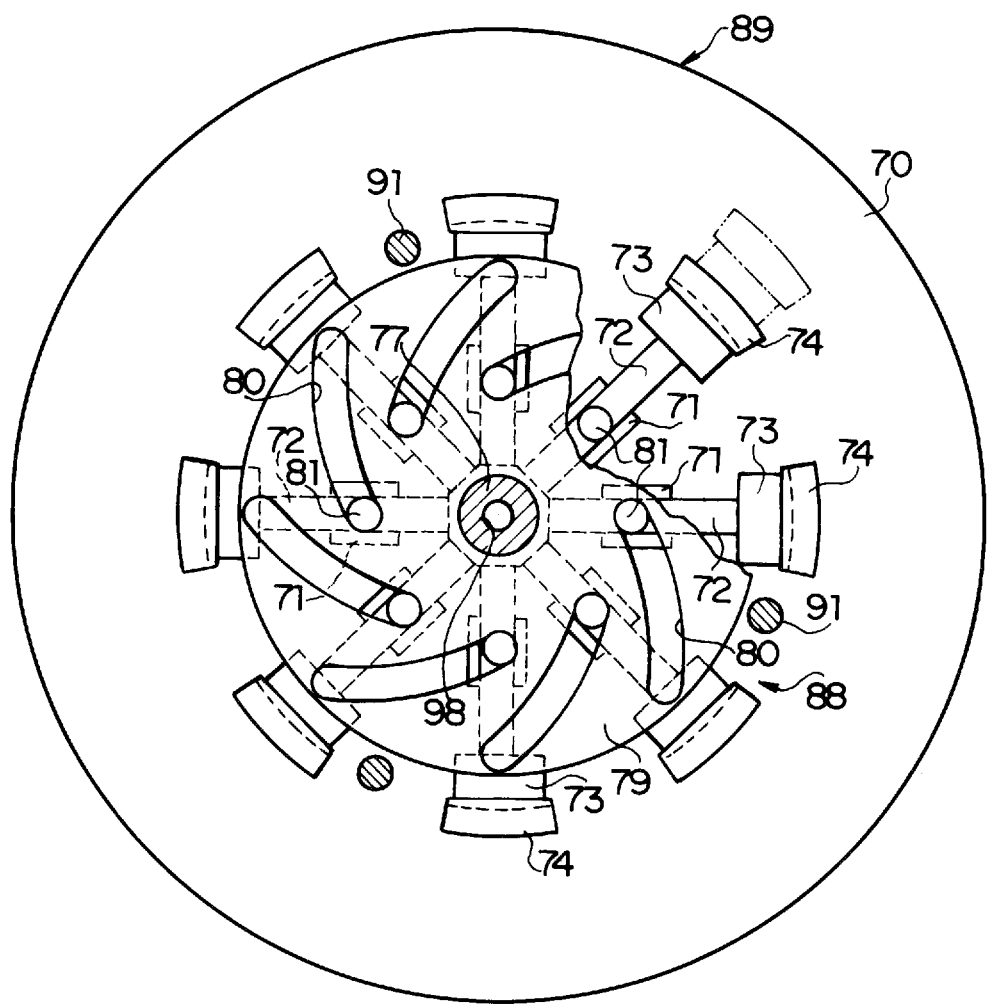
FIG. 5 is a partially-cut-away plan view showing a lower holder.

In FIGS. 1, 3 and 5, a horizontal lower support plate 70 in a discoid shape is installed at an end portion of the swing arm 64, and on an upper surface of this lower support plate 70, a plurality, herein 8, of guide blocks 71 are disposed in a circumferential direction at equal distances. A plurality (a number the same as the guide blocks 71) of sliders 72 extending radially are supported slidably by these guide blocks 71. Lower holding claws 73 extending vertically are fixed at radially outer ends of each slider 72, and locking portions 74 protruding to outward radially and having cross sections in approximately-triangular arc shape are formed at upper ends of these lower holding claws 73. In this way, a plurality of lower holding claws 73 having locking portions 74 formed on upper ends thereof are spaced from each other, and are supported so as to move synchronously and radially by a lower support plate 70 via the guide blocks 71 and the sliders 72, the locking portions 74 protruding outward radially. Additionally, these lower holding claws 73 (locking portions 74) can hold the green tire G, when the sliders 72 move synchronously and outward radially, and contact with a surface on a radially inner side and a surface at an axially inner side of the lower side bead portion B of the green tire G.

Represented by reference numeral 77 is a transfer shaft extending vertically while penetrating the lower support plate 70 coaxially with the lower support plate 70. A vertical central portion of this transfer shaft 77 is supported rotatably by the lower support plate 70 via a bearing 78. Moreover, Represented by reference numeral 79 is a horizontal discoid cam plate fixed to an upper end of the transfer shaft 77. A plurality (a number the same as the sliders 72) of cam grooves 80 are formed on this cam plate 79 in a circumferential direction at equal distances, the cam grooves 80 inclining in an identical direction with respect to radial directions, herein inclining from one side in a circumferential direction from a radially inner side to a radially outer side, to the other side in the circumferential direction. Represented by reference numeral 81 is a plurality (a number the same as the sliders 72) of pins fixed at lower end portions of each slider 72 and extending vertically, and upper end portions of these pins 81 are slidably inserted into the corresponding cam grooves 80 of the cam plate 79. As a result, the transfer shaft 77 and the cam plate 79 rotate as a whole, and thereby, the pins 81, the sliders 72 and the lower holding claws 73 are guided by the guide blocks 71, to be pushed to inclining sides of the cam grooves 80 and moved radially.

Represented by reference numeral 84 is a rotary actuator installed on a lower surface of the lower support plate 70 to supply and exhaust compressed air at a certified pressure. An external gear 86 fixed to a rotation shaft 85 of this rotary actuator 84 is in gear with an external gear 87 fixed at a lower end portion of the transfer shaft 77. As a result, the rotary actuator 84 functions and rotates the transfer shaft 77, for moving a plurality of sliders 72 and lower holding claws 73 synchronously and radially to hold and release the lower holding claws 73. The aforementioned guide blocks 71, sliders 72, transfer shaft 77, cam plate 79, pins 81, rotary actuator 84 and external gears 86, 87, as a whole, constitute a synchronous moving mechanism 88 for moving the plurality of lower holding claws 73 synchronously and outward radially, and the aforementioned lower holding claws 73 and the synchronous moving mechanism 88, as a whole, constitute a lower holder 89, as a holder at the other side (the lower side) for holding the lower side bead portion B of the green tire G. Further, in this disclosure, as the aforementioned synchronous moving mechanism, a plurality of cylinders, a screw mechanism, etc. for moving the upper holding claws 42 and the lower holding claws 73 synchronously and radially can be used.

Additionally, as mentioned above, when the upper holder horizontally holds the upper bead portion B of the green tire G horizontally, the fluid cylinder 32 functions and raises the upper holder 56 to the above position higher than the directly-below position J together with the green tire G; the moving means 67 (the driving motor 65) then swings the swing arm 64 to move the lower holder 89 from the standby position L to the directly-below position J; next, the fluid cylinder 32 functions to lower the upper holder 56 together with the green tire G, and the lower end of the green tire G, herein the lower end bead portion B, contact with the upper surface of the lower support plate 70. Then, as mentioned above, the side wall portion S of the green tire G is subjected to crush deformation locally in the circumferential direction, and the base width of the bead portions B varies in a circumferential direction. Therefore, as illustrated in FIG. 3, the lower bead portion B inclines with respect to the upper surface of the horizontal lower support plate 70, and only the part subjected to the most serious crush deformation of the lower side bead portion B of the side wall portion S is locally in contact with the lower support plate 70. At this state, the synchronous moving mechanism 88 functions and moves the lower holding claws 73 synchronously and outward radially, to contact the lower holding claws 73 below the locking portions 74 with the lower side bead portion B at a certified low contact pressure.

The fluid cylinder 32 then functions to raise the upper holder 56 and the green tire G, as a whole, and thereby, the lower end bead portion B is raised while being slidably connected to the lower holding claws 73. Then, a portion spaced above the lower support plate 70 of the lower side bead portion B, i.e., the bead portion B on the right side in FIG. 3, contacts with the locking portions 74 at an early stage to regulate the rise thereof. However, as the upper holder 56 and the green tire G are further raised, and the portion, of which the rise is regulated by the locking portion 74 of the side wall portion S, is deformed so as to be gradually expanded. Additionally, the upper holder 56 and the green tire G are raised until an axially inner side surface of the lower side bead portion B contacts with the locking portions 74 of all lower holding claws 73, and thereby, the lower side bead portion B becomes horizontal and parallel to the upper side bead portion B. In this way, the lower side bead portion B of the green tire G is held from the inner side of the lower holder 89, herein from the radially inner side and the axially inner side. Then, in the correcting apparatus, of course the upper holder 56 and the lower holder 89 are assembled while maintaining a coaxial relation, and thus the upper and lower side bead portions B, which are held by these upper holding claws 42 of the upper holder 56 and the lower holding claws 73 of the lower holder 89, become parallel and coaxial with each other, as mentioned above.

Further, in this disclosure, it is possible to omit the detecting sensors 61 disposed on the aforementioned upper holder 56 (the upper holding claws 42), and to dispose a plurality of detecting sensors the same as the detecting sensors 61 spaced from each other in a circumferential direction on the lower support plate 70 of the lower holder 89; or, in addition to the detecting sensors 61, to dispose detecting sensors the same as the detecting sensors 61 spaced from each other in a circumferential direction on the lower support plate 70 of the lower holder 89, for detecting the distances from the detective sensors to the green tire G by using these detecting sensors, and to thereby detect whether the bead portions B of the green tire G are held by the upper and lower holders 56 and 89 at a defined state. In this way, the upper holder 56 and the lower holder 89 are spaced vertically from each other, constituting a pair of holders for holding a pair of bead portions B of the green tire G while maintaining a coaxial relation. In addition, in this disclosure, it is possible to leave the lower holder 89 standing at the directly-below position J, and on the other hand, remove the lower holder 89 and simultaneously move the same in an inclined direction or in a crank-like manner, when lifting the upper holder 56 up and down between the delivery position K and an above position.

Here, the upper and lower side bead portions B of the green tire G are held from the radially inner side and the axially inner side by the aforementioned upper and lower holders 56 and 89 forming a pair, while in this disclosure, it is possible to hold the upper and lower side bead portions B of the green tire G by using a pair of holders from only the radially inner sides, or from the radially inner sides and the axially inner sides, or from both the radially inner sides and axially inner and outer sides. Moreover, in this embodiment, the fluid cylinder 32 functions as a driving means and lift one holder (the upper holder 56) up and down, herein moves the same in axial direction of the green tire G, to move the upper holder 56 and the lower holder 89 forming a pair toward or away from each other, while in this disclosure, it is possible to install the upper holder 56 on the guide post 31 so that the axial movement thereof is disabled, and on the other hand, to dispose a driving means the same as mentioned above for lifting the lower holder 89 up and down to move the lower holder 89 toward or away from the upper holder 56, or to dispose a driving means to lift the lower holder 89 up and down in addition to the fluid cylinder 32 for lifting the upper holder 56 up and down, for lifting the upper and lower holders 56 and 89 forming a pair up and down to move the same relatively toward or away from each other. Further, in this embodiment, the horizontal green tire G (a pair of bead portions B) is held by a pair of holders, while in this disclosure, it is possible to hold a vertical (a state that the rotation axis of the green tire G is extending horizontally) green tire G with a pair of holders. In this case, a pair of holders relatively move toward and away from each other by moving horizontally.

It is possible to secure the holding of the lower side bead portion B by the lower holder 89 (the lower holding claws 73), and to simultaneously set the lower side bead portion B and the upper side bead portion B to be coaxial easily and securely, by spacing such upper and lower holders 56 and 89 forming a pair vertically from each other, and simultaneously lifting either holder, herein the upper holder 56, up and down, to thereby dispose a driving means (the fluid cylinder 32) for moving the upper and lower holders 56 and 89 forming a pair toward and away from each other, and to set the lower holder 89 to have a horizontal lower support plate 70 and locking portions 74 formed thereon and to have a plurality of lower holding claws 73 spaced from each other in a circumferential direction, the locking portions 74 being supported so as to move synchronously and radially by the lower support plate 70 and protruding outward radially, and to further lower the horizontal green tire G, of which the upper side bead portion B is maintained in the horizontal state by the upper holder 56, together with the upper holder 56 on the upper side as a whole, to contact with the lower support plate 70, and then to move the lower holding claws 73 synchronously and outward radially to contact with the lower side bead portion B of the green tire G, and then to raise the upper holder 56 and the green tire G until the inner side surface of the lower side bead portion B contacts with the locking portions 74 of all lower holding claws 73. Further, in this disclosure, it is possible to contact the lower holding claws 73 with the lower side bead portion B by moving the lower holding claws 73 synchronously and outward radially, and then synchronously lower all lower holding claws 73 until the locking portions 74 thereof contact with the inner side surface of the lower side bead portion B.

In addition, as mentioned above, by disposing the moving means 67 for moving the lower holder 89 between the directly-below position J, which is located directly below the upper holder 56 in an above position, and the directly-below position J, which is spaced from the standby position L horizontally at a predetermined distance, and simultaneously disposing the bearer 16 for storing the green tire G horizontally directly below the directly-below position J, to thereby lower the upper holder 56 and hold the upper side bead portion B of the green tire G stored at the bearer 16, and then raise the upper holder 56 together with the green tire G to a position above the directly-below position J, and next move the lower holder 89 with the moving means 67 from the standby position L to the directly-below position J, and then lower the upper holder 56 together with the green tire G and hold the lower side bead portion B of the green tire G by using the lower holder 89 located at the directly-below position J, it is possible to easily apply the apparatus to an existing apparatus, and to easily improve security of operators.

Represented by reference numeral 91 is a plurality (3) of connecting rods erected on the upper surface of the lower support plate 70, and these connecting rods 91 are extending vertically in a side radially outer than a circumference of the cam plate 79, and are disposed in a circumferential direction at equal distances. A horizontal intermediate plate 92 located directly above the cam plate 79 is fixed at upper ends of these connecting rods, and a lower clamping 93 is installed removably on an upper surface of this intermediate plate 92. In addition, a cylindrical support post 94 extending vertically is installed at an axial central portion of this lower clamping 93, and a horizontal upper clamping 95, which is in pair with the lower clamping 93, is fixed to an upper end of this support post 94 while maintaining a coaxial relation with the lower clamping 93. Represented by reference numeral 96 is a bladder formed of vulcanized rubber, with an upper end portion held by a circumferential portion of the upper clamping 95. A lower end portion is held by a circumferential portion of the lower clamping 93, while maintaining a sealed state. This bladder 96 is cylindrical when no load is applied, and is disposed on a radially inner side of the pair of bead portions (the upper and lower side bead portions B), the pair of bead portions being coaxial by being held by the upper and lower holders 56 and 89, while maintaining a coaxial relation with the pair of bead portions B.

Here, by being held by the upper and lower holders 56 and 89, an axial central portion of the bladder 96 overlaps a tread center of the green tire G axially, the green tire G having a pair of bead portions B coaxial with each other (having the same height). In addition, wall thickness t of the bladder 96 is equal at any position in the axial direction except for portions held by the lower and upper clampings 93 and 95, and the value thereof is preferably within a range of 4 mm to 6 mm. Represented by reference numeral 98 is a path formed in the transfer shaft 77. A lower end of this path 98 is connected to a pressurized fluid source or vacuum source for storing, for example, pressurized air, nitrogen gas, etc., via a connecting pipe which is not illustrated. In addition, the upper end of the path 98 is connected removably to a lower end of a connecting pipe 99, and an upper end of this connecting pipe 99 penetrates the support post 94 and is connected to a sealed space 100, the sealed space 100 being surrounded by the lower clamping 93, the support post 94, the upper clamping 95 and the bladder 96.

Figure 6:
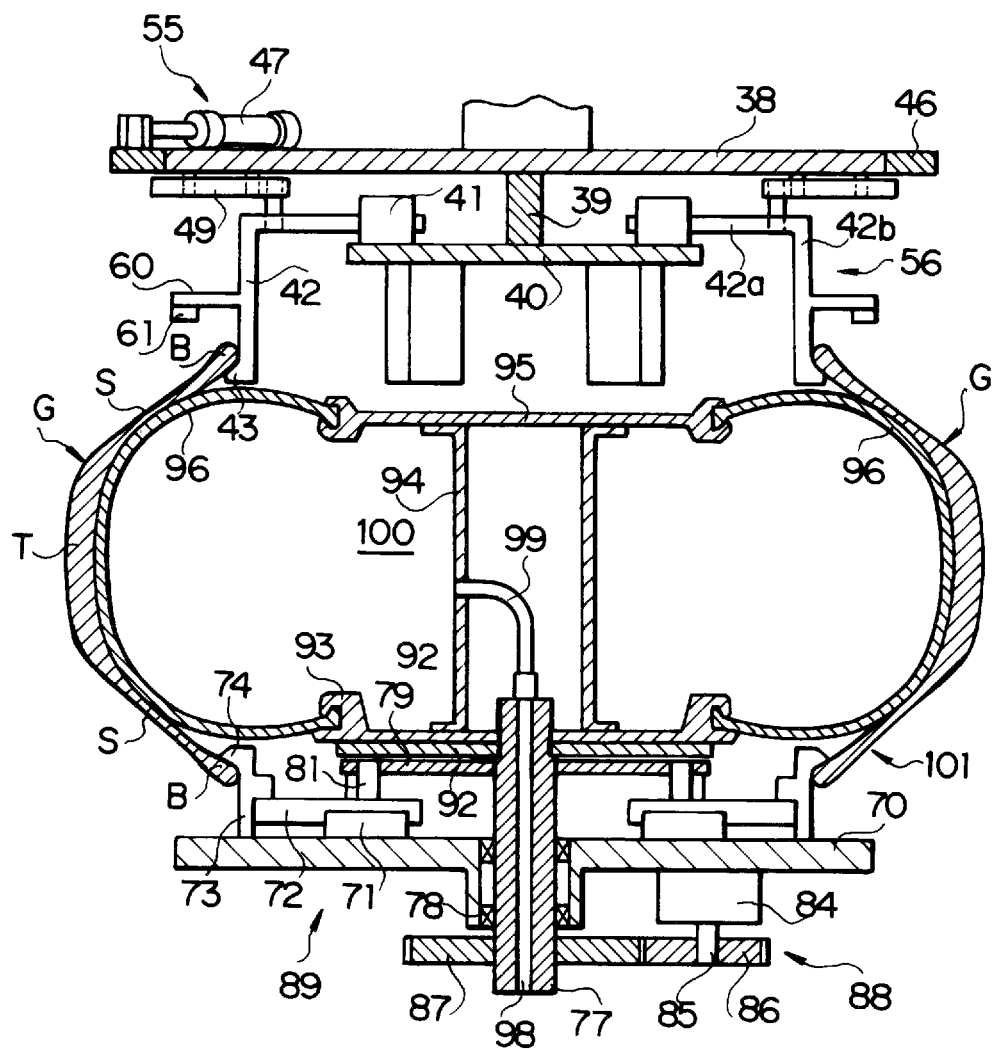
FIG. 6 is a front cross-sectional view showing a state that the green tire held by the holders is being corrected.

Additionally, during an ordinary time when no correcting operation is performed to the green tire G, the sealed space 100 is connected to a vacuum source, and as a result, an internal pressure of the sealed space 100 is reduced and the axial central portion of the bladder 96 is reduced in diameter inward radially, as illustrated in FIG. 3. On the other hand, the upper and lower bead portions B of the green tire G are held by the upper and lower holders 56 and 89 and become coaxial, the sealed space 100 and the pressurized fluid source are connected, and a pressurized fluid at an identical pressure is continuously provided to the sealed space. As a result, the bladder 96 inflates so as to protrude outward radially, and thereby, a pressurized fluid is applied via the bladder 96 to an inner chamber of the green tire G, with the upper and lower side bead portions B held by the upper and lower holders 56 and 89 forming a pair. In this way, when the bladder 96 inflates in the inner chamber of the green tire G, the bladder 96 is pressed against an inner surface of the tread portion T of the green tire G, and thereby, the tread portion T is moved radially so that the central axis thereof is in accord with (coaxial with) the central axis of the upper and lower side bead portions B forming a pair, which are maintained in a coaxial relation. In addition, as mentioned above, when the bladder 96 inflates, the bladder 96 is pressed against inner surfaces of both side wall portions of the green tire G, and thus, as illustrated in FIG. 6, these two side wall portions S are deformed to be bended in a shape (an arc shape) protruding outward, herein outward axially and outward radially, generating an internal tension in a meridian direction in the side wall portions S.

Thereby, the tread portion T of the green tire G is approximately recovered to the position where the green tire molding ended, and by means of temporary storage, crush deformation and creases generated locally in the circumferential direction of a side wall portion S are stretched and recovered together with plastic deformation, and the shape of the green tire G is corrected to a shape approximately the same as the shape when the green tire molding ended. Here, the pressure of the pressurized fluid provided into the aforementioned bladder 96 is set to be lower than the pressure when elongation of the bladder 96 began. This is for the reason that when the pressure is set to be more than the elongation initiating pressure, elongation is generated locally in the bladder 96 having a lower tensile rigidity and there are cases that ununiform elongation is generated on a side wall portion S, but if the pressure is set as mentioned above, it is possible to uniformly press the portions subjected to crush deformation of the side wall portion S from the inner side and to uniformly recover the crush deformation.

The aforementioned lower clamping 93, support post 94, upper clamping 95, bladder 96 and connecting pipe 99, as a whole, provide the pressurized fluid from the pressurized fluid source to the inner chamber of the green tire G, with the upper and lower side bead portions B held by upper and lower holders 56 and 89 forming a pair, the central axis of the tread portion T of the green tire G is set to be in accordance with the central axis of upper and lower bead portions B forming a pair, which are maintained in a coaxial relation, and the side wall portion S is deformed outward, to form a correcting means 101 for correcting the shape of the green tire G before vulcanization. Further, when varying the size of the bladder 96 depending on size variation of the aforementioned green tire G, it is possible to remove the correcting means 101 from the intermediate plate 92, and to exchange the same with one of a corresponding size.

In this way, by applying the pressurized fluid to the inner chamber of the green tire G, with the bead portions B held by upper and lower holders 56 and 89 forming a pair, setting the central axis of the tread portion T of the green tire G to be in accord with the central axis of the pair of bead portions B, and simultaneously deforming the side wall portion S outward to generate an internal tension in the meridian direction of the side wall portion S, the shape of the green tire G is corrected, and thus the crush deformation generated in the side wall portion S due to temporary storage is effectively recovered before vulcanization. Thereby, it is possible to easily improve uniformity of a vulcanized tire product, and in particular, the method is effective to a tire wherein the side wall portions S are thin and a side wall portions S is subjected to serious crush deformation due to temporary storage. Further, in this disclosure, it is possible to omit the aforementioned bladder 96, and to directly apply the pressurized fluid to the inner chamber of the green tire G, with the bead portions B held by the upper and lower holders 56 and 89 and thereby made coaxial. In this case, however, the pressure control of the pressurized fluid may become relatively difficult if it is intended to prevent local elongation and/or diameter increase of the green tire G. For this reason, it is preferable to use the bladder 96 as mentioned above.

Here, it is also considerable to hold the tread portion T of the green tire G, where crush deformation is generated on a part of the side wall portions S, with the holders from the radially inner side or the radially outer side, and to simultaneously set the central portion of the tread portion T to be in accord with the central axis of the pair of bead portions B, which are maintained in a coaxial relation, by moving these holders radially. However, when merely moving the tread portion T radially in this way, the side wall portions S are not pressed outward, and the inner side thereof is not applied a tension, and thus the deformation in a side wall portion S, if generated, is elastic deformation, resulting in that when released from holding, crush deformation is restored to the side wall portion S and the tread portion T becomes unusable.

Effect of the Embodiment 1 is described as follows.

First, when the molded green tire G is horizontally carried in by an operator, etc. to the bearer 16 at a position other than the delivery position K, and is stored while being held by the bearer 16 from below, the driving motor 21 of the moving mechanism 26 functions and rotates the rotation plate 15 around the axis of the rotation shaft 13, to move the green tire G carried on the bearer 16 to the delivery position K. Then, by hanging on the storage rods A and temporarily stored, the green tire G is subjected to crush deformation locally in the circumferential direction of a side wall portion S, and further, the portions in the bead portions B where the crush deformation is generated are spaced from each other and base width of the bead portion B varies in the circumferential direction of the green tire G. Therefore, the upper side bead portion B often inclines with respect to the horizontal direction. In addition, in this case, the lower holder 89 stands by at the standby position L due to swing of the swing arm 64, and further, the sealed space of the bladder 96 is connected to a vacuum source, to contract the axial central portion of the bladder 96.

The fluid cylinder 32 of the moving means 37 then functions and the upper holder 56, which is standing by at an above position, is guided by the guide post 31, and is simultaneously lowered together with the swing arm 34, and lower end portions of the upper holding claws 42 enter into the green tire G temporarily stored at the delivery position K over the upper side bead portion B (lower than the upper side bead portion B). Next, when the fluid cylinder 47 of the synchronous moving mechanism 55 functions to rotate the rotation ring 46, the transfer links 49 synchronously swing centered on the pins 50, from the position illustrated with virtual line to the position illustrated with solid line in FIG. 4, while such synchronous swing of the transfer links 49 is transferred to the upper holding claws 42 via the pins 52. Thereby, these upper holding claws 42 are guided by the guide blocks 41 and simultaneously moved synchronously and outward radially, and the lower end portions of all upper holding claws 42 are in contact with the upper side bead portion B at a certified low contact pressure.

At this state, the fluid cylinder 32 of the moving means 37 functions and raises the swing arm 34 and the upper holder 56, and then, the upper holding claws 42 are raised while being slidably connected to the upper side bead portion B, and simultaneously, the lowered side of the upper side bead portion B is pulled up by the locking portions 43, resulting in that the locking portions 43 of all upper holding claws 42 become in contact with the surface on the axially inner side of the upper side bead portion B. Then, as illustrated in FIG. 3, the upper side bead portion B is held by all upper holding claws 42 and becomes horizontal. Here, when any one of the upper holding claws 42 fails to hold the upper side bead portion B, a portion on the upper side bead portion B corresponding to the upper holding claw 42 becomes lower than other portions, while in this case, the detecting sensors 61 detect the state and repeat the operation until all upper holding claws 42 hold the upper side bead portion B.

Next, the fluid cylinder 32 of the moving means 37 further functions to raise the upper holder 56 along the guide post 31, and lifts the green tire G held by the upper holder 56 from the delivery position K to an above position. The driving motor 65 of the moving means 67 then functions to swing the swing arm 64 centered on the guide post 63, and moves the lower holder 89 from the standby position L illustrated with solid line in FIG. 1 to the directly-below position J. Next, the fluid cylinder 32 of the moving means 37 functions again to lower the upper holder 56, and moves the upper holder 56 toward the lower holder 89, while this upper holder 56 is lowered until the lower side bead portion B of the green tire G held by the upper holder 56 contacts the upper surface of the lower support plate 70.

Then, as mentioned above, the side wall portion S of the green tire G is subjected to crush deformation locally in the circumferential direction, and base width of the bead portions B varies in the circumferential direction. Therefore, the portion subjected to the most serious crush deformation of the side wall portion S of the lower side bead portion B becomes in contact with the lower support plate 70 at first, and the lower side bead portion B inclines with respect to the horizontal upper surface of the lower support plate 70. At this state, the rotary actuator 84 of the synchronous moving mechanism 88 functions to rotate the transfer shaft 77 and the cam plate 79 as a whole, and the pins 81, the slider 72 and the lower holding claws 73 are guided by the guide blocks 71, to be pushed to the inclining sides of the cam grooves 80 and move synchronously and outward radially. As a result, the lower holding claws 73 lower than the locking portions 74 contact with the lower side bead portion B at a certified low contact pressure.

The fluid cylinder 32 of the moving means 37 then functions to raise the upper holder 56 and the green tire G, and then the lower side bead portion B is raised while being connected slidably to the lower holding claws 73. Then, the lower side bead portion B, which is greatly spaced above the lower support plate 70, contacts with the locking portions 74 at an early stage to regulate the rise thereof. However, as the upper holder 56 and the green tire G are further raised, the portion of the side wall portions S, of which the rise is regulated by the locking portions 74, is deformed so as to be gradually expanded. Additionally, the rise of the upper holder 56 and the green tire G is performed until the axially inner side surface of the lower side portion B contacts with the locking portions 74 of all lower holding claws 73, and thereby, the lower side bead portion B becomes horizontal and becomes parallel to the upper side bead portion. In this way, the lower side bead portion B of the green tire G is held from the inner side.

Then, the upper holder 56 and the lower holder 89 are assembled while being maintained in a coaxial relation, and thus the upper and lower side bead portions B, which are held by these upper holding claw 42 of the upper holder 56 and lower holding claws 73 of the lower holder 89, become parallel and coaxial with each other, as mentioned above. In this way, the upper and lower side bead portions B forming a pair of the green tire G are held by the upper and lower holders 56 and 89 forming a pair while maintaining a coaxial relation. Then, an axial central portion of the bladder 96 axially overlaps the tread center of the green tire G, the green tire G having a pair of bead portions B coaxial with each other (having the same height). Next, a switching valve which is not illustrated is switched, the sealed space 100 is switched from being connected to the vacuum source to being connected to the pressurized fluid source, and the pressurized fluid is provided to the sealed space 100.

As a result, the bladder 96 inflates so as to protrude outward radially, and thereby, a pressurized fluid is applied via the bladder 96 to an inner chamber of the green tire G, with the upper and lower side bead portions B held by the upper and lower holders 56 and 89 forming a pair. In this way, when the bladder 96 inflates in the inner chamber of the green tire G, the bladder 96 is pressed against an inner surface of the tread portion T of the green tire G, and thereby, the tread portion T is moved radially so that the central axis of the tread portion T is in accord with (coaxial with) the central axis of the upper and lower side bead portions B forming a pair which are maintained in a coaxial relation. In addition, as mentioned above, when the bladder 96 inflates, the bladder 96 is pressed against inner surfaces of both side wall portions of the green tire G, and thus, as illustrated in FIG. 6, these two side wall portions S are transformed to be bended in a protruding shape (in an arc shape) outward (toward at least one of the axially outer side and the radially outer side), generating an internal tension in meridian direction in the side wall portions S.

Thereby, the tread portion T of the green tire G is approximately recovered to the position where the green tire molding ended, and by means of temporary storage, crush deformation and creases generated locally in the circumferential direction of the side wall portions S are stretched and recovered together with plastic deformation, and the shape of the green tire G is corrected to a shape approximately the same as the shape when the green tire molding ended. Here, the time to provide the pressurized fluid and inflate the bladder 96 is set to be 0.3 to 0.7 times to the vulcanization time of the green tire G by the vulcanization apparatus 27, which is preferable because of being possible to effectively correct the side wall portions S, without disturbing the vulcanization cycle time. Next, the switching valve is switched to connect the sealed space 100 and the vacuum source, to contract the axial central portion of the bladder 96. The rotary actuator 84 then functions to the lower holding claws 73 synchronously and inward radially, and the lower side bead portion B is released from holding by the lower holding claws 73.

Next, the fluid cylinder 32 functions to hold the upper holder 56 and the green tire G to an above position, the driving motor 35 functions to swing the swing arm 34 from the position illustrated with solid line to the position illustrated with virtual line in FIG. 1, to carry the green tire G from the above position to a position directly above the vulcanization apparatus 27. The fluid cylinder 32 then functions to carry the green tire G into the vulcanization apparatus 27, and the moving means 37 then functions to recover the upper holder 56 to the above position. Then, the driving motor 65 functions to cover the lower holder 89 from the directly-below position J to the standby position L. The green tire G is then vulcanized into a tire product with the vulcanization apparatus 27.

A test example is described as follows. In this test, a comparative green tire having a size of 195/65R15 and an embodiment green tire were temporarily stored by hanging on 2 storage rods at normal temperature for 3 days. Next, the comparative green tire was subjected to vulcanization without shape correction, and the tire was then disposed to a uniformity machine and the RFV of the tire was measured. On the other hand, the embodiment green tire was subjected to shape correction by the aforementioned correcting apparatus, then subjected to vulcanization, and was next disposed to a uniformity machine, and the RFV of the tire was measured. As a result, comparing with the comparative green tire, the RFV of the embodiment green tire was reduced by 33.4%, and the uniformity thereof was securely improved.

Figure 7:
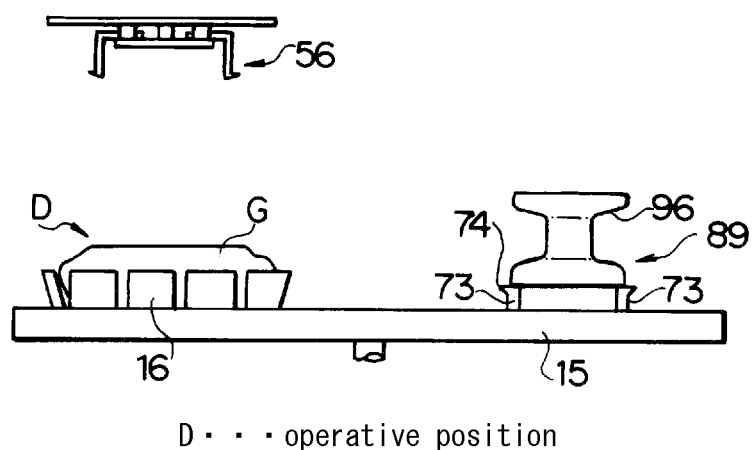
FIG. 7 is a partially-cut-away schematic front view showing Embodiment 2 of this disclosure.
Figure 8:
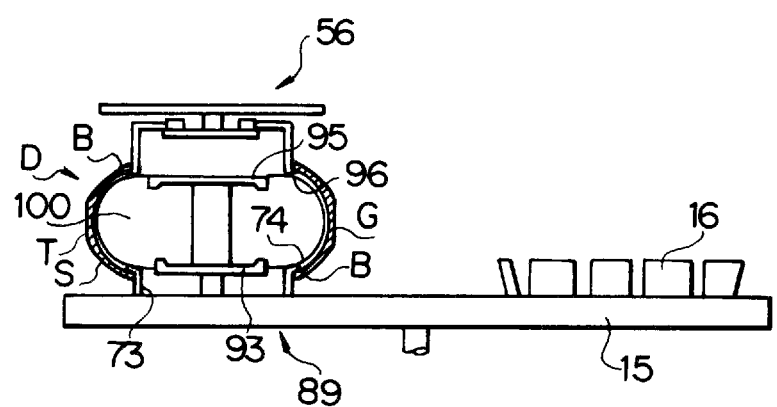
FIG. 8 is a partially-cut-away schematic front view showing a green tire as being corrected.
Figure 9:
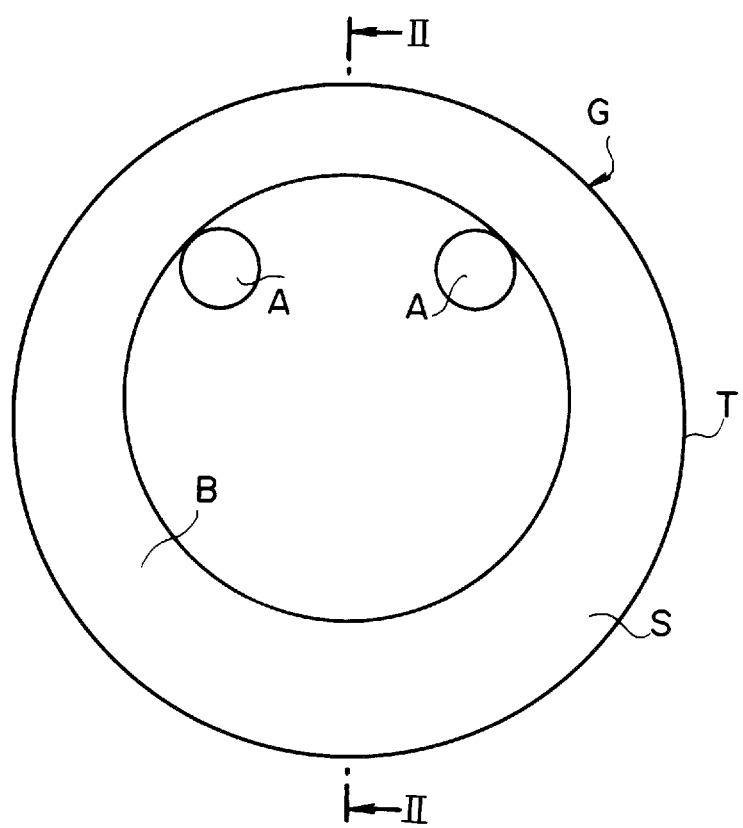
FIG. 9 is a front view showing the green tire as being stored with storage rods.
Figure 10:
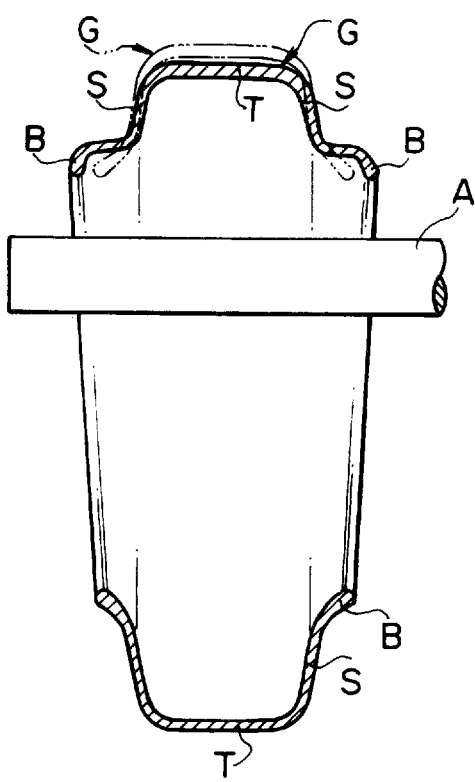
FIG. 10 is a cross-sectional view as seen in the direction of arrows II-II of FIG. 9.

FIGS. 7 and 8 illustrate Embodiment 2 of this disclosure. In this embodiment, the guide post 63, the swing arm 64, the support block 66 and the moving means 67 in the Embodiment 1 are omitted, while the lower holding claws 73, the synchronous moving mechanism and the bladder 96, which are supported by the swing arm 64, are supported by a rotation plate 15 as a lower support plate rotatable in a horizontal plane. Here, at least one, herein two bearers 16 are disposed in a circumferential direction at equal distances on this rotation plate 15, and the lower holding claws 73 are supported at equal distances from these bearers 16 for storing the green tire G. Additionally, these lower holding claws 73 can be moved synchronously and radially by a synchronous moving mechanism the same as mentioned above (not illustrated). The aforementioned lower holding claws 73 and synchronous moving mechanism, as a whole, constitute a lower holder 89 as a lower side holder for holding the lower side bead portion B of the green tire G.

In addition, a bladder 96 is disposed on the rotation plate 15 at a portion where the lower holding claws 73 are disposed, the bladder 96 having lower and upper end portions held at a sealed state by lower and upper clampings 93 and 95 the same as mentioned above and being coaxial with the lower holding claws 73. This bladder 96 is connected to a pressurized fluid source or vacuum source. As a result, the lower holding claws 73, the bladder 96, and the bearers 16 of the green tire G which are spaced from each other horizontally from the lower holding claws 73 and the bladder 96, are disposed on the rotation plate 15 as the lower support plate. Additionally, this rotation plate 15 is displaced in a horizontal plane by being intermittently rotated by a displacing mechanism the same as the moving mechanism 26, which is not illustrated, and thereby, the lower holding claws 73, the bladder 96 and the bearers 16 can be located alternatively at an operative position D directly below the aforementioned upper holder 56. Further, in this disclosure, it is possible to displace the lower support plate by straightly moving or rotating the same in an arc shape.

Additionally, when the bearer 16 storing the green tire G is located at the operative position D, due to function of the driving means (the fluid cylinder), the upper holder 56 is lowered to the bearer 16 located at the operative position D, and the upper side bead portion B of the green tire G stored by the bearer 16 is maintained horizontal. The upper holder 56 is then raised together with the green tire G to an above position above the operative position D and temporarily stands by, and next, the rotation plate 15 (the lower support plate) is displaced (rotated) in a horizontal plane by the displacing mechanism, and the holding claws 73 and the bladder 96 are located at the operative position D. Next, the upper holder 56 is lowered together with the green tire G until the green tire G contacts with the rotation plate 15 (the lower support plate), and the lower holding claws 73 are then moved synchronously and outward radially to the outer side in and contacts with the lower side bead portion B of the green tire G.

Then, the upper holder 56 and the green tire G are raised slightly until the lower side bead portion B contacts with locking portions 74 of all lower holding claws 73, the lower side bead portion of the green tire G is held by these lower holding claws 73, and then, the pressurized fluid is provided to the sealed space 100 in the bladder 96, and the bladder 96 inflates so as to protrude outward radially. As a result, the bladder 96 is pressed against the inner surface of tread portion T of the green tire G, and the a central axis of the lower bead portion B is set to be in accordance with the central axis of (corrected to be coaxial with) the upper and lower bead portions B, and is pressed against the inner surfaces of both side wall portions S of the green tire G, and both side wall portions S are deformed to be bended in a shape protruding outward (in an arc shape), generating an internal tension in a meridian direction in the inner side. Thereby, the tread portion T of the green tire G is approximately recovered to the position where the green tire molding ended, and by means of temporary storage, crush deformation and creases generated locally in the circumferential direction of the side wall portions S are stretched and recovered together with plastic deformation, and the shape of the green tire G is corrected to a shape approximately the same as the shape when the green tire molding ended. In this way, by using the Embodiment 2, it is possible to effectively correct the shape of the green tire G with a simple structure.

INDUSTRIAL APPLICABILITY

This disclosure can be applied to the technical field of correcting the shape of a green tire having a side wall portion that has been subjected to crush deformation locally in the circumferential direction.

REFERENCE SIGNS LIST 16 bearer
32 driving means
56, 89 holder
61 detecting sensor
67 moving means
70 lower support plate
73 lower holding claw
74 locking portion
96 bladder
101 correcting means
G green tire
B bead portion
S side wall portion
T tread portion
J directly-below position
L standby position
D operative position

The invention claimed is:

1. An apparatus for correcting the shape of a green tire, comprising:
    a pair of holders for holding a pair of bead portions of a green tire subjected to crushing deformation locally in a circumferential direction of a side wall portion, while maintaining a coaxial relation thereof; and
    a correcting means for correcting the shape of the green tire by applying a pressurized fluid to an inner chamber of the green tire with bead portions held by the pair of holders, setting a center axis of a tread portion of the green tire to be in accord with central axes of the pair of bead portions which are maintained in a coaxial relation, and deforming the side wall portions toward an outer side;
    said correcting means comprising a bladder to be set on a radially inner side of the pair of coaxial bead portions, coaxially with the center axis of the bead portions, wherein the bladder has a constant thickness and is configured so that, as the bladder is supplied with a pressurized fluid at a pressure no higher than an elongation initiating pressure of the bladder, the pressure is applied to the inner chamber of the green tire via the bladder, causing the bladder to be inflated and pressed against an inner surface of the tread portion and the side wall portions of the green tire,
    wherein the pair of holders are spaced from each other in a vertical direction, said apparatus further comprises a driving means for moving the pair of holders toward and away from each other by lifting either one of the holders up and down, the lower side holder having a horizontal lower support plate and a plurality of lower holding claws, the lower holding claws being spaced from each other in a circumferential direction, supported on the lower support plate so as to be synchronously movable in radial directions, and having locking portions formed at an upper end thereof to protrude radially outward, wherein the apparatus is configured so that a green tire, which is laid horizontally with its upper side bead portion held horizontally by the upper side holder, is lowered together with the upper side holder to contact with the lower support plate, the lower holding claws are then synchronously moved radially outward to contact with a lower side bead portion of the green tire, and the upper side holder and the green tire are then raised until an inner side surface of the lower side bead portion contacts with the locking portion of all the lower holding claws, in order to set the lower side bead portion to be coaxial with the upper side bead portion,
    and wherein the apparatus further comprises a moving means for moving the lower side holder between a directly-below position right below the upper side holder and a standby position separate from the directly-below position at a predetermined distance in a horizontal direction, and a bearer for storing the green tire horizontally right below the directly-below position, wherein the apparatus is configured so that the upper side holder is lowered to hold the upper side bead portion of the green tire stored on the bearer, the upper side holder is then raised above the directly-below position together with the green tire, the lower side holder then is moved by the moving means from the standby position to the directly-below position, and the upper side holder is lowered together with the green tire, in order to hold the lower side bead portion of the green tire by the lower side holder at the directly-below position.

2. The apparatus for correcting the shape of a green tire according to claim 1, further comprising a plurality of detecting sensors set separately in a circumferential direction on at least one of said holders, for detecting whether the bead portions of the green tire are held by the holders at a defined state, by detecting distances from the detecting sensors to the green tire with the detecting sensors.

3. The apparatus for correcting the shape of a green tire according to claim 1, wherein the lower holding claws, the bladder coaxial with the lower holding claws, and the bearer of the green tire spaced from the lower holding claws and the bladder in a horizontal direction are disposed on the lower support plate, said apparatus further comprising a displacing means for locating the lower holding claws, the bladder and the bearer alternatively at an operative position right below the upper side holder by displacing the lower support plate in a horizontal surface; wherein the apparatus is configured so that the upper side holder is lowered to the bearer located at the operative position to hold the upper side bead portion of the green tire stored on the bearer, the upper side holder is then raised above the operative position together with the green tire, the lower support plate is then displaced to locate the lower holding claws and the bladder at the operative position by the displacing means, and the upper side holder is then lowered together with the green tire, in order to hold the lower side bead portion of the green tire by the lower holding claws at the operative position.

* * * * *